United States Patent [19]
Kim

[11] Patent Number: 5,943,178
[45] Date of Patent: Aug. 24, 1999

[54] METHOD AND APPARATUS FOR LOCKING HOUSING DOOR OF A RECORDING/ REPRODUCING DEVICE AFTER A PREDETERMINED PERIOD OF TIME HAS ELAPSED

[75] Inventor: Wan Soo Kim, Suwon, Rep. of Korea

[73] Assignee: Samsung Electronics Co., Ltd., Kyungki-Do, Rep. of Korea

[21] Appl. No.: 08/057,548

[22] Filed: May 6, 1993

[30]      Foreign Application Priority Data

May 6, 1992 [KR]   Rep. of Korea .......................... 92-7624

[51] Int. Cl.⁶ ..................................................... G11B 15/18
[52] U.S. Cl. ............................................... 360/69; 360/137
[58] Field of Search ............................... 360/69, 71, 137; 369/39; 340/825.31, 542; 70/267, 268, 77, 91

[56]            References Cited

U.S. PATENT DOCUMENTS 3,946,204   3/1976   Taniguchi et al. ..................... 360/71 X
4,851,937   7/1989   Sander ....................................... 360/69

*Primary Examiner*—Andrew L. Sniezek
*Attorney, Agent, or Firm*—Sughrue, Mion, Zinn, Macpeak & Seas, PLLC

[57]                      ABSTRACT

A method for locking a housing door of a VCR, or the like. The housing door is locked in response to a locking signal supplied to a servo portion by a controller if no key is operated for a predetermined period of time regardless of the VCR power-on or off state, the existence of a tape within the deck, and the operation status of the VCR. If a key is input while the housing door is locked, the count parameter is reset to 0, and then, the counting is resumed. Thus, the housing door is unlocked only when necessary, so that the intrusion of foreign materials into the deck can be prevented.

8 Claims, 1 Drawing Sheet

METHOD AND APPARATUS FOR LOCKING HOUSING DOOR OF A RECORDING/ REPRODUCING DEVICE AFTER A PREDETERMINED PERIOD OF TIME HAS ELAPSED

BACKGROUND OF THE INVENTION

1. Field of the Invention

The present invention relates to a method for locking a housing door of a video cassette recorder (hereinafter term "VCR"), or the like, and particularly to a method for locking the housing door using a timer, in which the housing door is automatically locked after a predetermined period of time has elapsed, regardless of whether a tape is within the deck or not.

2. Background of the Invention

VCRs which are commercially available at present ordinarily do not have a locking device on the housing door and, therefore, if a child inserts something such as food or other foreign materials into the deck, damage is likely to occur to the VCR.

Further, known locking devices function only when a tape is in the deck and, therefore, when there is no tape in the deck, the locking device is ineffective. Therefore, if foreign materials are inserted into the deck when there is not a tape therein, damage to the deck may still occur.

Japanese Patent Hei-102763 discloses a VCR wherein, if a cassette is not installed for a predetermined time after an unloading, a cassette holder withdraws to close the door and stops at a frontal waiting position, thereby preventing the intrusion of dust and the like. However, in such a device, the housing door is locked only when a cassette is not installed for a predetermined time.

SUMMARY OF THE INVENTION

The present invention is intended to overcome the above described disadvantages of the conventional techniques.

An object of the present invention is to provide a method for locking a housing door by using a timer, in which the housing door is automatically locked after a predetermined period of time has elapsed regardless of the existence of a tape within the deck, thereby preventing the intrusion of foreign materials into the deck.

In achieving the above object, the circuit for locking the housing door using a timer includes a key input portion for providing key signals corresponding to input keys, a microprocessor controller for providing control signals to respective sections in accordance with the key signals from the key input portion, a servo portion for receiving control signals from the microprocessor controller to control drum, capstan and loading motors and a deck housing portion for controlling the tape within the deck under the control of the servo portion.

The method for locking the housing door according to the present invention is characterized in that the housing door is automatically locked by the servo portion under the control of the microprocessor controller, if the timer of the microprocessor judges that there is no key input after the final key input, regardless of the power on/off state of the VCR, the existence of a tape within the deck, and the mode of operation of the VCR.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
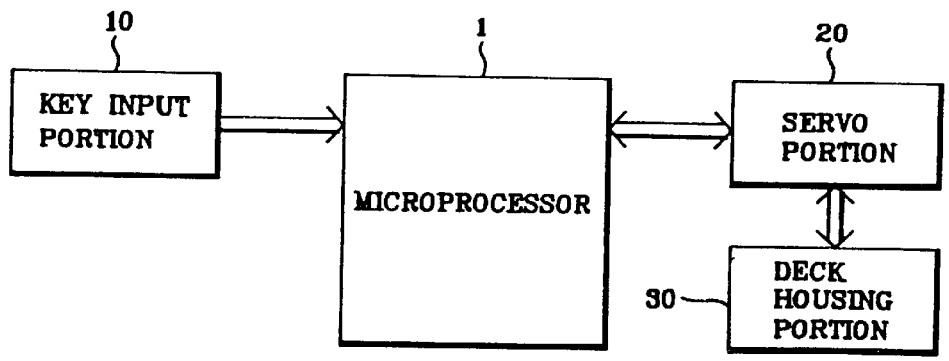
FIG. 1 is a block diagram showing a circuit for carrying out the locking of a housing door according to a preferred embodiment of the present invention.

FIG. 1 is a block diagram showing the circuit for carrying out the locking of a housing door utilizing a timer according to the preferred embodiment. The circuit includes: a key input portion 10 consisting of a key panel installed on a VCR and a remote controller for providing signals for operations such as power-on or off, reproduction, recording, FF, REW and the like; a microprocessor 1 for providing control signals to the respective sections so as to control the entire system in accordance with the key signals from the key input portion 10; and a servo portion 20 connected to the microprocessor 1, for locking or unlocking the housing door of a deck housing portion 30 in accordance with the control signals from the microprocessor 1.

The microprocessor 1 includes a timer and, if a key input is not carried out at the key input portion 10 for a predetermined time, as counted by the timer, a locking signal is output to the servo portion 20, thereby locking the housing door.

Figure 2:
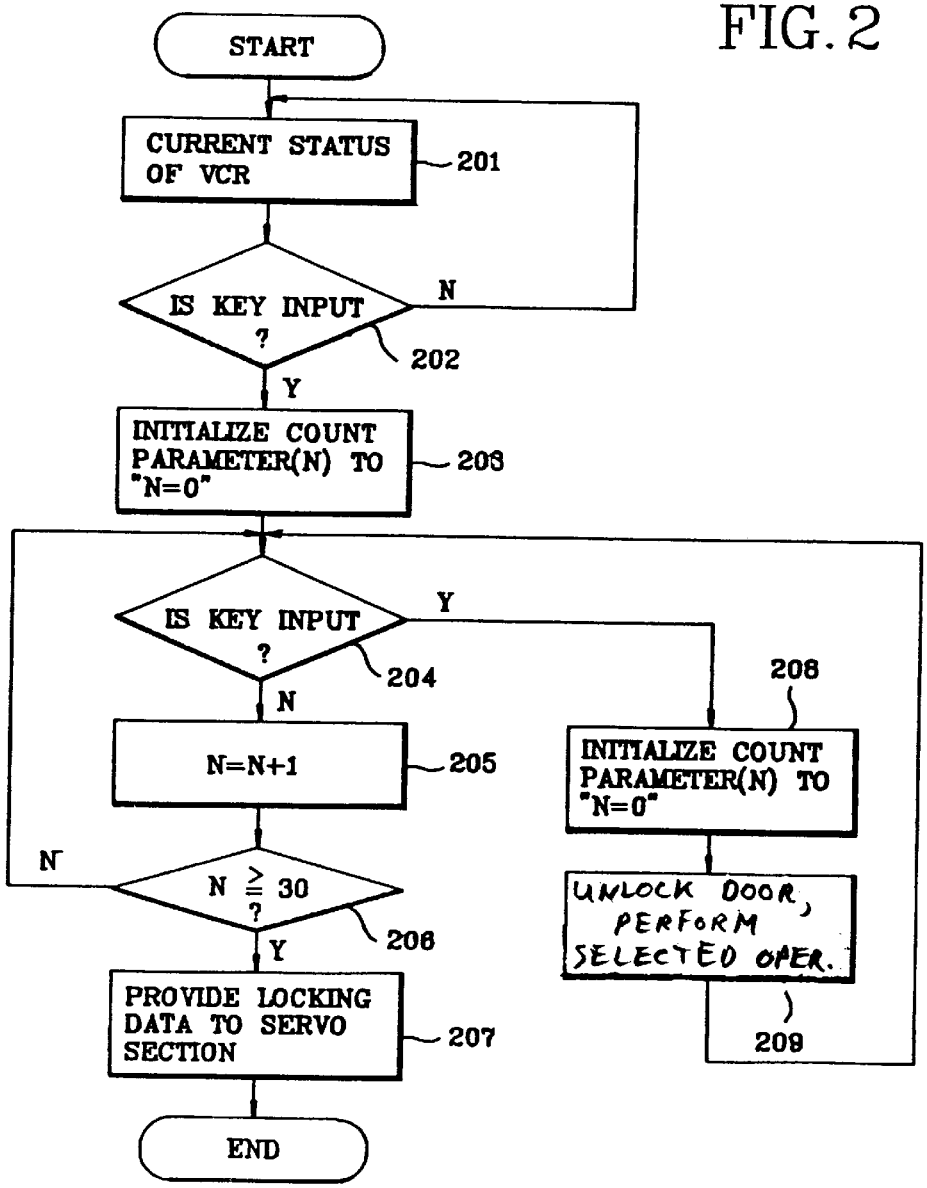
FIG. 2 is a flow chart for carrying out the locking of a housing door according to a preferred embodiment of the present invention.

FIG. 2 is a flow chart for carrying out the locking of a housing door using a timer according to the present invention.

Specifically, the method for locking the housing door includes the steps of: judging the current status of the VCR such as power-on or off, the existence of a tape within the deck, and the operation or non-operation of the VCR (step 201); judging as to whether a key is input from the key input portion 10 under the current status of the previous step (step 202); resetting the count parameter N counted by the timer of the microprocessor 1 to "N=0", if there is a key input from the key input portion 10 (step 203); judging again as to whether there is any key input from the key input portion 10 (step 204); increasing the count parameter N by 1 if there is no key input (step 205); judging as to whether the increased count parameter N has reached a predetermined value (e.g., N≧30) (step 206); returning the system to step 204 to confirm the key input further if the count parameter N has not reached a predetermined value, and locking the housing door by providing a locking signal to the servo portion 20 if the parameter N has reached the predetermined value (N≧30) which indicates that there has not been any key operations from the key input portion 10 during a predetermined time (e.g., 30 seconds), if the timing is set to one second per increment of 1 of the parameter N (step 207); resetting the count parameter N to "N=0" to open the housing door if there is a key input operation at step 204 (step 208); and returning to step 204 after carrying out the relevant operation for the key input (step 209).

In the present invention as described above, if the microprocessor 1 does not receive an operation command from the key input portion 10, consisting of the key panel or the remote controller, the microprocessor 1 outputs a housing door locking signal to the servo portion 20. Then the servo portion 20 controls the deck housing portion 30 to lock the housing door. Of course, the time which is counted by the timer can be arbitrarily changed, as desired. 30 seconds is used in the preferred embodiment as an example.

Even if the VCR is currently in an operation mode (such as reproduction, recording and the like), if a command is not input from the key input portion 10 for a period of 30 seconds, the housing door is locked.

Now the operation of the microprocessor 1 under various conditions will be described with reference to FIG. 2.

At step 201, the microprocessor judges the current status of the VCR. For example, a tape can be inserted into the deck with power-off, a tape can be inserted into the deck with power-on, a tape can be inserted into the deck with power-on and the television being on, a tape can be inserted into the deck with power-on and with the VCR being operated (reproduction, recording, FF, REW and the like), or a tape is not inserted into the deck with power-off, and a tape is not inserted into the deck with power-on.

First, the case where a tape is inserted into the deck with power-off will be described. The timer which is stored within the microprocessor 1 resets the count parameter N to N=0 at step 203 and starts to count, if any final key is input from the key input portion 10 (step 202). Then step 204 is carried out to confirm as to whether a new key has been input from the key input portion 10 subsequent to the input of the final key.

If it is judged that no further key has been input, step 205 is carried out to increase the count parameter N (N=N+1), and a discrimination is made as to whether the count parameter N has reached 30 (N≧30). Under this condition, it is assumed that the count parameter is increased by 1 every second. Therefore, if the count parameter N has not reached 30, the system is returned to step 204 and repeats steps 204, 205 and 206 until the count parameter N reaches 30.

Under this condition, if it is judged that the count parameter N has reached 30 at step 206, the microprocessor 1 provides a housing door locking signal to the servo portion 20, thereby locking the housing door (step 207).

Meanwhile, if it is judged that a key is input at step 204, step 208 is carried out to reset the count parameter N to N=0, and then, step 209 is carried out to unlock the housing door and carry out the operation corresponding to input key at step 204, and the system returns to step 204 at which the key inputs are confirmed.

Next, the case where a tape is inserted into the deck while the television is on or the VCR is being operated (reproduction, recording, FF, REW and the like) will be described. In this state, if a key is input from the key input portion 10, the procedure of the operation is the same as the case where a tape is inserted into the deck with power-off. That is, the timer of the microprocessor 1 begins counting, and the housing door is locked if no data is input from the key input portion 10 for a period of 30 seconds. Meanwhile, if a key is input from the key input portion 10 within 30 seconds, the count parameter N is reset to 0, the housing door is unlocked, and the operation corresponding to the key input is carried out.

Meanwhile, if a tape is not inserted into the deck and the power is off, 30 seconds are counted in the same was as the case where a tape is inserted into the deck with the power off. If a key is not input, the housing door is locked, and if a key is input while the housing door is locked, the count parameter N is reset to 0. Then the housing door is unlocked, and the operation corresponding to the key input is carried out.

When a tape is not inserted into the deck and power is on, the procedure of the operation is the same as the case where a tape is inserted into the deck with power off. Under this condition, even if data such as time setting and programmed recording setting in the form of an on-screen display (OSD) is input into the microprocessor 1 by the remote controller of the key input portion 10, the count parameter is rest to 0 unconditionally so as to resume counting once again.

According to the present invention as described above, when the power source of the VCR is on or off, or when the VCR is operating or not operating, if a key is not input for a predetermined time as counted by the timer of the microprocessor, then the microprocessor outputs a housing door locking signal to the servo portion, thereby locking the housing door. Meanwhile, if a key is input before the predetermined time has elapsed, or if a key is input with the housing door locked, the housing door is unlocked, and the count parameter is reset to 0. Then the counting is resumed, so that the housing door is unlocked only when necessary for proper operation. This prevents the intrusion of foreign materials into the device. Consequently, damage to the device can be avoided.

While the preferred embodiment is applied to a VCR, it is apparent that the present invention can be applied to a wide variety of recording/reproduction devices which utilize various types of recording media. For example, the invention can be applied to audio cassette recorders or CD players. Also, the servo portion can include a solenoid, servo motor or any other appropriate mechanism for locking the door.

The invention has been described through a preferred embodiment. However, various modifications can be made without departing from the scope of the invention as defined by the appended claims.

What is claimed is:

1. A method for locking a door of a housing of a recording/reproduction device, said method comprising the steps of:

judging whether an input key has been operated; and locking the door of the housing if said input key has not been operated for a predetermined elapsed time period, said locking step being conducted independently of the operating status of the recording/reproduction device.

2. A method as claimed in claim 1, further comprising the steps of:

incrementing a count parameter representing elapsed time at fixed intervals; and resetting the count parameter and carrying out an operation corresponding to said input key when the input key is judged as being operated during said judging step.

3. A method as claimed in claim 2, wherein said resetting step further comprises the step of;

unlocking the door of the housing if the door of the housing is locked.

4. A method as claimed in claim 3 wherein said recording/reproduction device is a video cassette recorder.

5. A method as claimed in claim 2, wherein said count parameter is incremented by 1 every second in said incrementing step.

6. A method as claimed in claim 5 wherein said recording/reproduction device is a video cassette recorder.

7. A method as claimed in claim 2 wherein said recording/reproduction device is a video cassette recorder.

8. A method as claimed in claim 1 wherein said recording/reproduction device is a video cassette recorder.

\* \* \* \* \*